United States Patent [19]

Niedecker

[11] Patent Number: 4,563,792
[45] Date of Patent: Jan. 14, 1986

[54] PROCESS OF MANUFACTURING TUBULAR WRAPPERS FROM A CONTINUOUS WEB OF PLASTIC MATERIAL SHEETING

[76] Inventor: Herbert Niedecker, Am Ellerhang 6, D 6240 Königstein 2, Fed. Rep. of Germany

[21] Appl. No.: 537,755

[22] Filed: Sep. 30, 1983

[30] Foreign Application Priority Data

Oct. 2, 1982 [DE] Fed. Rep. of Germany ....... 3236553

[51] Int. Cl.$^4$ ............................................. A22C 11/02
[52] U.S. Cl. .......................................... 17/33; 17/49; 53/576; 53/122; 53/550
[58] Field of Search .................. 17/38, 39, 49, 33, 34, 17/35; 53/517, 576, 505, 122, 67, 66, 76, 550, 138 R, 138 A

[56] References Cited

U.S. PATENT DOCUMENTS

| | | | |
|---|---|---|---|
| 1,292,645 | 1/1919 | Reisfeld | 17/33 |
| 3,916,598 | 11/1975 | Adams et al. | 53/64 X |
| 4,257,146 | 3/1981 | Karp | 17/35 X |
| 4,479,283 | 10/1984 | Hollingsworth | 17/49 |

FOREIGN PATENT DOCUMENTS 1411489  4/1969  Fed. Rep. of Germany .

*Primary Examiner*—Willie G. Abercrombie
*Attorney, Agent, or Firm*—Sprung, Horn, Kramer & Woods

[57] ABSTRACT

In the making of sausages wherein a continuous web of plastic sheet is supplied and formed into a tubular wrapper about a filling tube, the wrapper is filled with sausage meat, and the filled tubular wrapper is intermittently closed to form sausages, the improvement which comprises controlling the filling and closing steps in dependence upon the amount of unfilled formed tubular wrapper waiting to be filled. An apparatus therefor is provided, including a stop displaceable longitudinally along the filling tube against a spring, the stop actuating certain switches as it moves back and forth along the filling tube, the switches controlling the supply of plastic sheet, filling supply and closing of the sausages.

2 Claims, 2 Drawing Figures

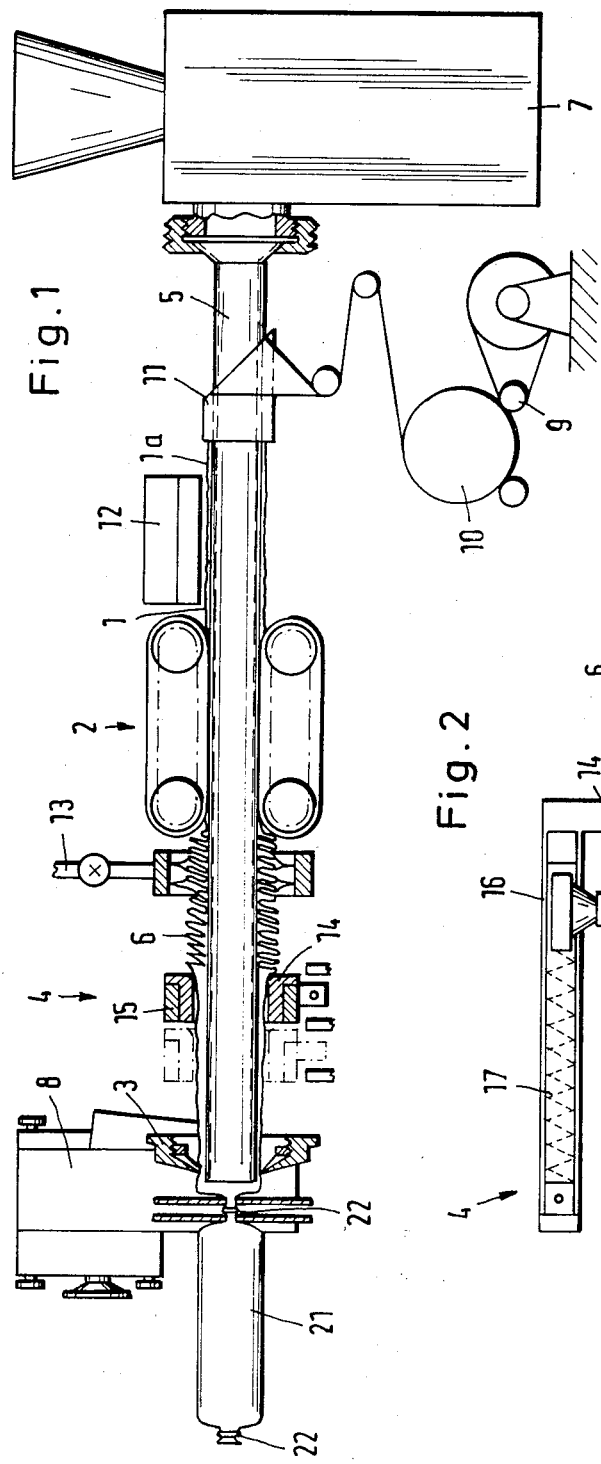
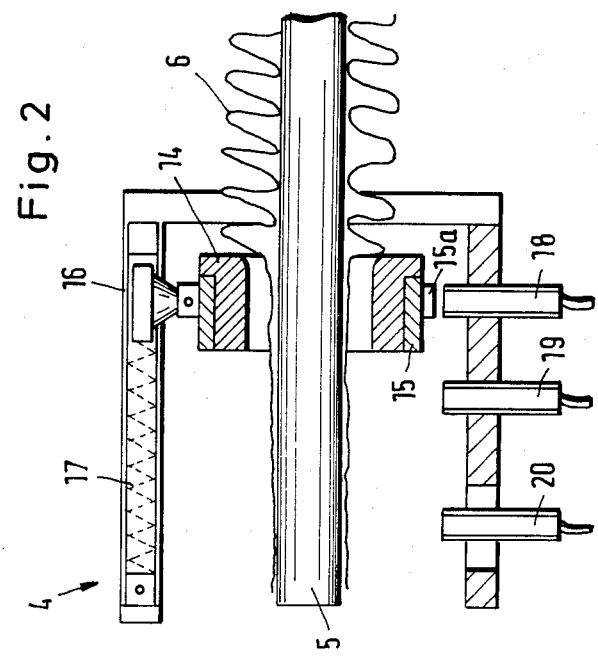

PROCESS OF MANUFACTURING TUBULAR WRAPPERS FROM A CONTINUOUS WEB OF PLASTIC MATERIAL SHEETING

This invention relates to a process of manufacturing tubular wrappers, particularly sausage casings, from an endless web of plastic material sheeting on a filling tube, whereafter the wrapper is filled with sausage meat or the like, and packaged portions, particularly sausages, are formed and closed.

In the filling and closing of sausages it is known from Laid-open German Application No. 14 11 489 to withdraw the casing material required for the sausage from a roll of plastic material sheeting and to form the casing in that the sheeting is shaped on the filling tube on a shaping shoulder to form a tubing having overlapping edges, which are subsequently welded. The sausage casing is then withdrawn from the filling tube under the filling pressure and is filled in portions and closed in front of the end of the filling tube.

That practice can be used only to fill sausages having rather fluid contents. These sausages are filled only to a slack condition and must subsequently be shrunk in a separate operation so that a firm sausage is obtained.

In a prior application of the same applicant (EPA 82 200 774) it has been proposed for a process of the kind described first hereinbefore to provide on the filling tube a casing snubber, known per se, so that the tight stuffing which is desired can be achieved without a subsequent shrinking and a backflow of the fluid contents will be avoided. To ensure that the tubular wrapper which has just been made will not be stressed by the filling pressure as it is withdrawn, that prior application contains the additional proposal to make available by the sheeting feeder an adequate supply of casing material for the filling operation in a slack condition in front of the casing snubber. In that connection it is particularly contemplated that the continuous feeding of the sheeting will be discontinued when the supply of casing material that has been formed exceeds the supply which is required for the filling operation.

But that practice fails to eliminate another disadvantage of the apparatus known from Laid-open German Application No. 14 11 489. That disadvantage resides in that that apparatus constitutes an overall apparatus for making, filling and closing the wrapper and cannot be altered, which means that the filling and closing means cannot alternatively be used to make sausages from corrugated tubing. For this reason there is a desire for a logical cooperation of the unit for making tubular wrappers from a continuous web of plastic material sheeting on a filling tube with a preceding filling machine and a succeeding closing machine when it is required, for instance, when certain materials are to be packaged in a tubular wrapper made from a low-cost web of plastic material sheeting whereas the filling and closing combination should alternatively be usable for filling sausages made from corrugated tubing. When wrappers are to be made from a continuous web of plastic material sheeting and a unit serving that purpose is interposed between a filling machine and a closing machine, each machine must be separately controlled and this makes high demands on the attention of the operators if an adequate matching of the manufacture of sheeting, the filling operation and the closing operation is to be achieved. That requirement for a separate control is also undesirable from the aspect of safety. For this reason it is an object of the invention to combine the plant for making tubular wrappers from a continuous web of sheeting on a filling tube with a preceding filling machine and a succeeding closing machine in an overall plant in such a manner that a central control is achieved and the several operations are performed in an automatic sequence.

This object is accomplished in accordance with the invention in that the switch which in accordance with the prior application is actuated in dependence on the tubing supply constitutes a control device by which the filling machine and the closing machine are also controlled in dependence on the tubing supply. Because the plant for making the tubular material is thus linked to the filling and closing machines, the individual units are combined in a plant in which the units cooperate in dependence on each other. The tubing supply formed on the filling tube as a result of the feeding of tubing serves as a central element for initiating the operation of the entire plant. In a preferred embodiment the control device which is actuated by the tubing supply can also control the delivery of the continuous web of plastic material sheeting.

Apparatus for carrying out the process according to the invention consists preferably of a stop, which is slidable on the filling tube and which may preferably consist of a restraining sleeve, which surrounds the filling tube. The holder for the stop is slidably mounted in a track and the stop is displaced in the filling direction by the tubing supply against an adjustable restoring force. The stop actuates one or more switching elements for controlling the tubing feeder, the filling machine, the closing machine and, if desired, the drive means for delivering the continuous web of plastic material sheeting.

The advantage which is afforded by the fact that the individuual units are combined in accordance with the invention resides in that the unit for making the tubing can be removed from the overall plant when prefabricated corrugated tubing for making packaged portions is available so that the tubing is not made on the filling tube from flat plastic material sheeting. In that case the filling machine and the closing machine are directly connected without the unit for making the tubing.

Details of the process according to the invention and of the apparatus for carrying out the process will be described with reference to the drawings.

FIG. 1 is a side elevation showing the entire plant consisting of a plant for making tubing in combination with a preceding filling machine and a succeeding closing machine.

FIG. 2 shows the device for controlling the plant for making tubing in response to the tubing supply.

In accordance with FIG. 1, the welded tubular wrapper 1 is fed by the tubing feeder 2 toward the tubing snubber 3. The control device 4 is provided between the tubing feeder 2 and the tubing snubber 3 and in dependence on the tubing supply 6 formed on the filling tube 5 controls the preceding filling machine 7, the succeeding closing machine 8 and the drive means 9 for the roll 10 of sheeting.

The tubular sheeting 1a is formed by means of the shaping shoulder 11 and is joined by the welding device 12 to form the tubing 1 and can subsequently be wetted by the device 13 with a cooling and/or lubricating fluid.

The control device 4 shown on a larger scale in FIG. 2 consists of the stop 14, which has an inside diameter that is larger than that of the filling tube 5 and smaller than the outside diameter of the tubing supply 6.

The stop 14 is held in a holder 15, which is mounted in a track 16 so as to be displaceable against the restoring force of a spring 17.

The stop 14 is replaceable to match the diameter of the filling tube. As the tubing supply 6 is formed, the stop 14 is displaced against the restoring force of the spring 17 and is thus caused to move over the switch elements 18, 19, 20.

The mode of operation and the control of the entire plant by the tubing supply 6 will now be described.

A circuit-closing switch is provided on a control panel, not shown, which is suitably mounted on the plant for making tubing. In response to the actuation of that circuit-closing switch, the tubing feeder 2, the welding device 12 and the drive means 9 for the sheeting roll 10 are energized at the same time so that the tubing 1 is formed and by the tubing feeder 2 is advanced on the filling tube 5 toward the tubing snubber 3.

The tubing 1 is retained at the stop 14 to form a tubing supply 6. As the tubing supply 6 increases, the stop 14 is displaced against the restoring force of the spring 17 so that the holder 15, which includes an actuating element 15a, leaves its initial position at the switching element 18 and reaches the switching element 19. When the latter is actuated by the actuating element 15a of the holder 15, it de-energizes the plant for making tubing, i.e., the tubing feeder 2, the welding device 12 and the drive means 9 for the roll of sheeting 10.

When the switching element 19 is actuated in response to the presence of a certain tubing supply 6, the preceding filling machine 7 and the succeeding closing machine 8 are switched so that they are ready to operate. If certain requirements are to be met regarding the accuracy of the weight of each packaged portion 21, the filling machine 7 may be replaced by a different filling machine, such as a pump combined with a portioning device.

The entire plant can be operated for production when the individual units are ready for operation. Another switch for starting the entire plant is now actuated at the control panel so that the filling machine 7 discharges the predetermined portions. The tubing feeder 2, the welding device 12 and the drive means 9 for the roll of sheeting 10 are re-energized to form additional tubing supply 6. Under the filling pressure used to fill the portions, tubing 1 is taken from the tubing supply 6 in the amount required for each packaged portion 21. In step with the discharge of portions from the filling machine 7, the closing machine 8 closes the packaged portions 21 with a closing clip 22.

During the continuous manufacture of the packaged portions 21, additional tubing supply 6 is formed so that the holder 15 moves toward the switching element 20. When the actuating element 15a of the holder 15 reaches the switching element 20, the plant for making tubing is shut down and the tubing supply 6 is decreased by the making of the packaged portions 21 until the restoring spring 17 has pushed back the holder 15 to the switching element 19. Thereafter the plant for making tubing is re-energized by the actuating element 15a. The velocity at which the tubing is fed by the tubing feeder 2 is slightly higher than the velocity at which the tubing is removed from the tubing supply 6 as the packaged portions 21 are formed.

In case of trouble in the plant for making tubing, e.g., when the sheeting has been torn, the tubing supply 6 will be used up until the stop 15 has reached the switching element 18 so that the actuating element 15a shuts down the entire plant.

It will be understood that the specification and examples are illustrative but not limitative of the present invention annd that other embodiments within the spirit and scope of the invention will suggest themselves to those skilled in the art.

What is claimed is:

1. In an apparatus for making sausages comprising means for supplying a continuous web of plastic sheet to a filling tube and for forming said sheet into a continuous tubular wrapper before it leaves the filling tube, means for discharging sausage meat through the tube and into the tubular wrapper and for closing the filled wrapper at spaced locations to form sausages, the improvement which comprises means for sensing the amount of unfilled tubular wrapper on the filling tube and controlling the supplying and forming means and the discharging and closing means in response thereto, wherein the sensing means includes a stop in contact with the continuous tubular wrapper, means mounting the stop for longitudinal displacement downstream along the filling tube in response to a continuing supply of tubular wrapper, means urging the stop upstream, and switches located longitudinally along the filling tube and actuatable by the stop, wherein the switches are operatively connected with the discharging and closing means, and the supplying and forming means whereby the amount of unfilled tubular wrapper upstream of the stop determines the temporary position of the stop which in turn controls the activation of the supply of tubular wrapper.

2. An apparatus according to claim 1, wherein the means mounting the stop comprises a holder surrounding the filling tube and carrying the stop, and a track extending longitudinally of the filling tube, the holder moving along the track and carrying the stop therewith.

* * * * *